(12) United States Patent
Parvathy et al.

(10) Patent No.: US 7,529,977 B2
(45) Date of Patent: May 5, 2009

(54) AUTOMATED EXTENSIBLE USER INTERFACE TESTING

(75) Inventors: Ganesh Sankarakumar Parvathy, Redmond, WA (US); Dipti A Patil, Sammamish, WA (US); Jin Yu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 11/421,363

(22) Filed: May 31, 2006

(65) Prior Publication Data

US 2007/0294586 A1    Dec. 20, 2007

(51) Int. Cl.
*G06F 11/00* (2006.01)

(52) U.S. Cl. .............................. 714/38; 714/26; 714/27; 714/28; 702/123; 717/109; 717/125

(58) Field of Classification Search .................. 714/26, 714/27, 28, 38; 702/123; 717/109, 125
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 5,754,760 | A | 5/1998 | Warfield | |
| 6,067,639 | A * | 5/2000 | Rodrigues et al. | 714/38 |
| 6,662,312 | B1 * | 12/2003 | Keller et al. | 714/38 |
| 7,047,446 | B1 * | 5/2006 | Maurer et al. | 714/38 |
| 2002/0133807 | A1 | 9/2002 | Sluiman | |
| 2003/0131285 | A1 | 7/2003 | Beardsley et al. | |
| 2003/0135825 | A1 | 7/2003 | Gertner et al. | |
| 2004/0056894 | A1 | 3/2004 | Zaika et al. | |
| 2005/0066270 | A1 | 3/2005 | Ali et al. | |

OTHER PUBLICATIONS

Bass et al., "Rapid Software Development for Multi-Vendor Services" Available at http://www3.interscience.wiley.com/cgi-bin/abstract/109926343/ABSTRACT?CRETRY=1&SRETRY=0, Bell Labs Technical Journal, Feb. 17, 2005, vol. 9, Issue 4, pp. 155-169.
Braubach et al., "Using a Model-Based Interface Construction Mechanism for Adaptable Agent User Interfaces" Available at http://vsys-www.informatik.uni-hamburg.de/getDOC.php/publications/109/braubach_pokahr+02_aamas.pdf, 2 pages.
Stirewalt et al., "The Model-Composition Problem in User-Interface Generation" Available at http://www.springerlink.com/(sop154554wsf4t55fp2js155)/app/home/contribution.asp?referrer=parent&backto=searcharticlesresults,1,1, Automated Software Engineering, Springer Netherlands, vol. 7, No. 2, May 2000, pp. 101-124.

* cited by examiner

*Primary Examiner*—Robert Beausoliel
*Assistant Examiner*—Charles Ehne
(74) *Attorney, Agent, or Firm*—Lee & Hayes, PLLC

(57) ABSTRACT

Automated extensible user interface testing supports testing of a user interface of a program. Test data is accessed, the test data including multiple test steps. Each test step describes at least a part of a test to be performed on the user interface. For each of the multiple test steps, one or more application program interface (API) methods to invoke to carry out the part of the test is determined. This determination is based at least in part on the test data and on an identification from the API of methods supported by the API. Each of the one or more API methods is then invoked to carry out the part of the test. Verification can be performed to ensure, for example, that specified files were created, or registry values were changed, or user interface elements appear and exist.

17 Claims, 4 Drawing Sheets

AUTOMATED EXTENSIBLE USER INTERFACE TESTING

BACKGROUND

As computing technology has advanced and software programs have become increasingly complex, testing software programs has become an increasingly important part of the program development process. By testing programs, developers are able to identify and correct potential issues or problems with the programs before they are released to the end user, thereby improving the end user's experience.

One way in which software programs can be tested is manually. In manual testing, a human user interacts with the program, providing various inputs and verifying the results of those inputs. Such testing, however, can be very time-consuming, very costly, and of questionable quality (e.g., it may be difficult to verify that certain timing constraints of the program are satisfied). Accordingly, it would be beneficial to have an improved way to test software programs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The automated extensible user interface testing described herein supports testing of a user interface of a program. Test data that includes multiple test steps is accessed. Each test step describes at least a part of a test to be performed on the user interface. For each of the multiple test steps, one or more application program interface (API) methods to invoke to carry out the part of the test is determined. This determination is based at least in part on the test data and on an identification from the API of methods supported by the API. Each of the one or more API methods is then invoked to carry out the part of the test.

BRIEF DESCRIPTION OF THE DRAWINGS

The same numbers are used throughout the drawings to reference like features.

DETAILED DESCRIPTION

Automated extensible user interface testing is discussed herein. Multiple steps for testing a user interface are described in test data. The test data is accessed by a test engine, which determines the appropriate application program interface (API) method(s) to call to carry out the various steps. These methods are called to drive the user interface, verify the results and the results of the test can be output to a user.

Figure 1:
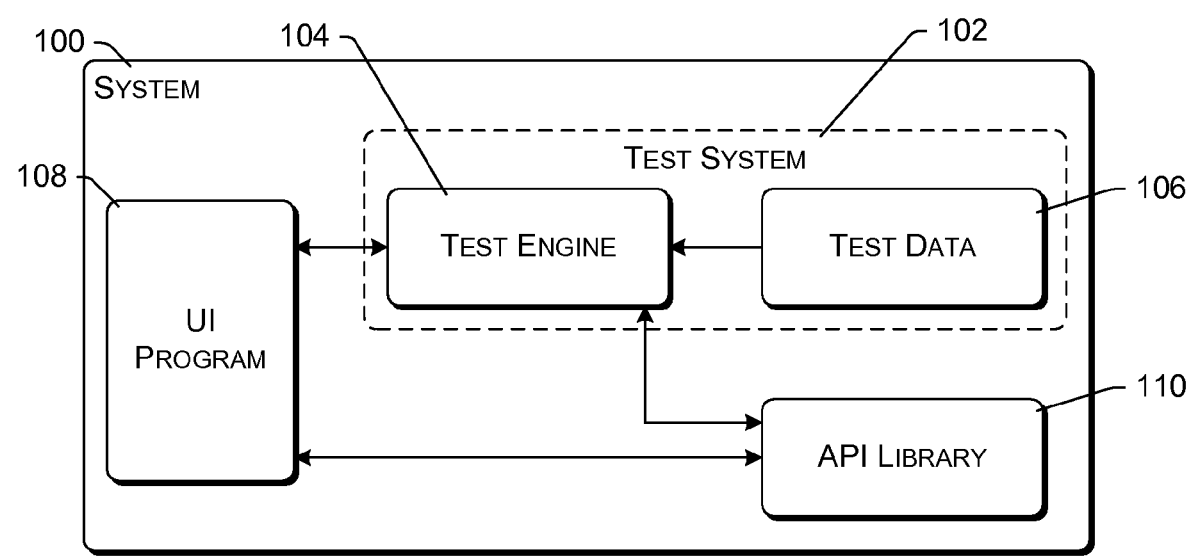
FIG. 1 is a block diagram illustrating an example system using the automated extensible user interface testing discussed herein.

FIG. 1 is a block diagram illustrating an example system 100 using the automated extensible user interface testing discussed herein. System 100 includes a test system 102 having a test engine 104 and test data 106. System 100 also includes a user interface (UI) program 108 to be tested and an API library 110. During operation, UI program test engine 104 tests the operation of UI program 108, verifying that the user interface of program 108 operates as desired. Program 108 is referred to as a UI program because program 108 has a user interface that is tested. Although described predominantly as testing a user interface, it is to be appreciated that the techniques discussed herein can also be used for testing other non-user interface aspects of program 108.

Test data 106 is a description of the test step(s) to be performed on UI program 108. In certain implementations, test data 106 is written using eXtensible Markup Language (XML), although alternatively other public or proprietary languages or data formats such as configuration/information files, plain text files, etc. may be used. During operation, test engine 104 accesses test data 106 and carries out the test step(s) described in test data 106. Test engine 104 can access test data 106 in a variety of different manners. For example, test data 106 may be input to test engine 104 when test engine 104 is invoked, test data 106 may be stored at some location that is known to test engine 104 and retrieved by test engine 104 from that location, the user of test engine 104 may input the location of test data 106 to test engine 104 and test engine 104 may retrieve the test data from that location, and so forth.

API library 110 includes multiple methods for interacting with UI programs. This interaction can be, for example, selection of a button, selection of a menu item, inputting data to a text box, inputting audio data, running a program, and so forth. Test engine 104 determines, based on test data 106, the appropriate method(s) of API library 110 to invoke (or call) in order to carry out the test step(s) described by test data 106. The desired test step(s) are then carried out by invoking or calling these determined method(s). Additionally, some of the test step(s) can be verification steps that verify the results of a previous test step(s). The verification step can be, for example, verification that a particular action was carried out, verification that a particular timing requirement was satisfied, verification that a particular result happened or did not happen, and so forth.

API library 110 can be any of a variety of public or proprietary API libraries. In certain embodiments, API library 110 is a library in accordance with the Microsoft® Automation for UI.

It should be noted that the user interface of UI program 108 is oftentimes a graphical user interface, although it need not be. Any of a variety of different user interface mechanisms can be supported by UI program 108. For example, the user interface may be audible, tactile, and so forth.

Additionally, as discussed in more detail below, test engine 104 communicates with API library 110 during operation to assist test engine 104 in determining the appropriate API method(s) to invoke for particular test steps to be carried out. This allows test system 104 to readily adapt to changes in API library 110. The particular method(s) to be invoked for particular test steps are not coded into test engine 104. Rather, the particular test steps are determined by test engine 104 during execution based on test data 106 and the results of the communication with API library 110.

Figure 2:
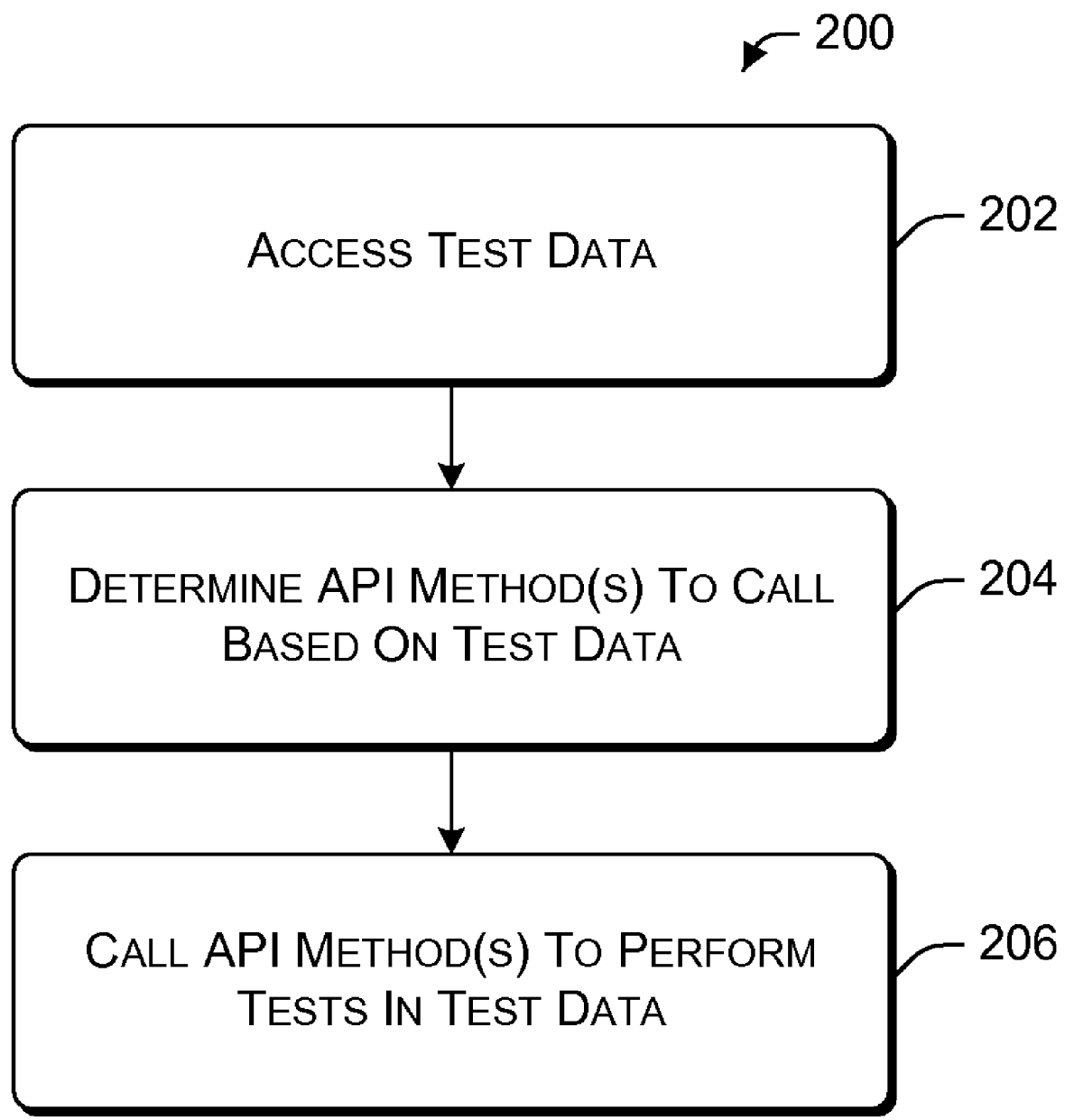
FIG. 2 is a flowchart illustrating an example process for automated extensible user interface testing.

FIG. 2 is a flowchart illustrating an example process 200 for automated extensible user interface testing. Process 200 can be carried out, for example, by test engine 104 of FIG. 1, and may be implemented in software, firmware, hardware, or combinations thereof. FIG. 2 is discussed with reference to the elements of FIG. 1.

Initially, the test data is accessed (act 202). As discussed above, this test data describes a test step(s) to be performed on a UI program, and the test data can be accessed in any of a variety of manners. The API method(s) to call to carry out the described test step(s) are then determined based on the accessed test data (act 204). The test data accessed in act 202 describes both a UI control and an action to take on that UI control. A UI control refers to any part of the UI that can be used to input information to the program and/or used by the program to output information to a user. Examples of UI controls include buttons, windows, textboxes, audio outputs, audio inputs, menus, and so forth. Different actions can be taken on different UI controls. For example, a button can be clicked, a menu option can be selected, text can be entered into a textbox, portions of a window can be read, and so forth.

UI controls as well as the actions to take on the UI controls can be specified in different manners. Different methods of API library 110 can be invoked to carry out the desired actions on the desired UI controls, with the particular method that is to be invoked to carry out a particular action on a particular UI control being dependent on the information that is included in the test data. The test data identifies the particular UI control using one of these different ways. For example, there may be multiple different ways to identify a particular UI control, such as by a unique identifier, by name assigned to the UI control, by a caption on the UI control, and so forth. A different method of API library 110 would be used for each of these different ways of identifying the UI control. Thus, in act 204, a determination is made as to which of these different methods is to be invoked in order to carry out the action on that particular UI control.

In act 204, the test engine may be programmed with certain API methods in the API library, or obtain information regarding which API methods are in the API library from some other source. Additionally, the test engine may also use Microsoft NET reflection to identify the different API methods and the way those API methods can be called (e.g., which different parameters or attributes those API methods use). Using reflection, the test engine interacts with API library 110, querying API library 110 as to which methods API library 110 supports and how to call those methods.

The method(s) determined in act 204 are then invoked to perform the desired test steps (act 206). Typically all of the test steps described in the test data are performed by process 200, although in some situations not all test steps may be performed. For example, if the verification of a particular test step fails, then all or some of the remaining test steps may not be performed. By way of another example, a particular test step may operate to determine which of multiple additional test steps to be performed (e.g., perform one test step if the particular test step is successful, but perform a different test step if the particular test step is not successful).

Figure 3:
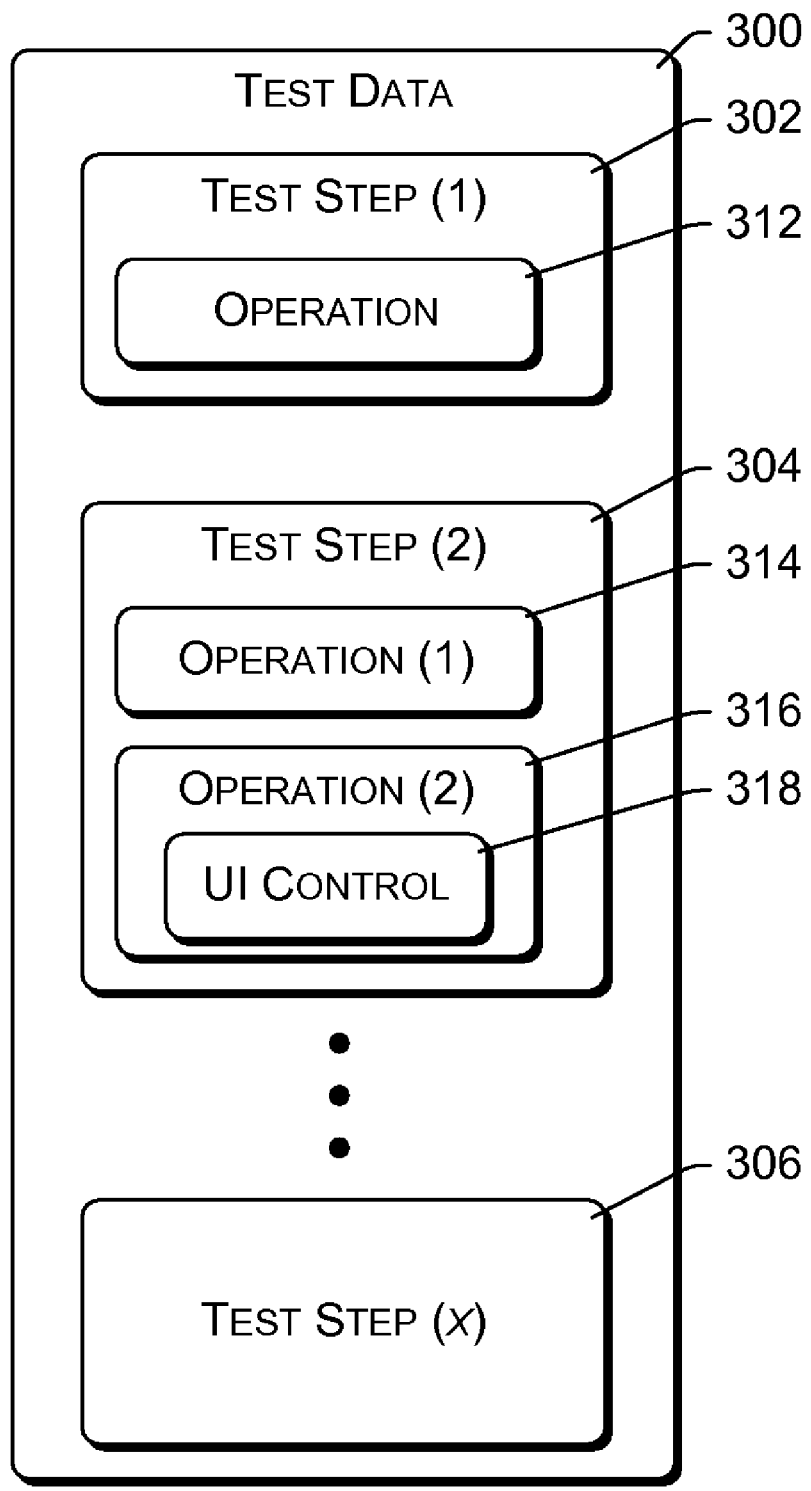
FIG. 3 is a block diagram illustrating an example of test data.

FIG. 3 is a block diagram illustrating an example of test data 300. Test data 300 can be, for example, test data 106 of FIG. 1. Test data 300 includes multiple (x) test steps 302, 304, ..., 306. Each test step 302, 304, ..., 306 describes a test(s), or portion(s) of a test, to be performed on a UI program. Each test step 302, 304, ..., 306 can include one or more operations that are a test(s) or portion(s) of a test.

Oftentimes each operation identifies a UI control and an action on that UI control, although in other cases there can be non-UI operations such as reading from the registry or running a command. In test data 300, test step 302 includes a single operation 312 which is a non-UI operation. Test step 304 includes an operation 314 that does not include a UI control, such as a Registry or Run Process operation, and an operation 316 that includes UI control 318. Operation 316 is an action that operates on UI control 318, while operations 314 and 312 perform non-UI tasks.

In certain embodiments test data 300 is in XML format, although alternatively other public or proprietary formats could be used. Different operations discussed herein can be described using different elements of a data structure (e.g., XML elements). In the following discussions, examples of test data are given in XML format. It is to be appreciated, however, that these are only examples and that other formats can alternatively be used. It is also possible to use different file formats (other than XML) for capturing the test data. Oftentimes, the XML file-based test data is loaded by test engine 104 and then verified for extra steps of correctness after the XSD schema verification.

In accordance with an example automated test schema, test data 300 is arranged using a Test Case element and one or more Test Step elements within the Test Case. Test Case is the top level XML Element that represents an end-to-end test case (typically, a series of multiple tests to be performed). The Test Case element includes fields or attributes describing the name of the test case, the author of the test case, the date of creation (or last modification) of the test case, and a description of the test case. The Test Case elements can have one or more Test Step elements within it as child elements.

One or more Test Step elements make a Test Case. All the child elements of Test Step discussed below (e.g., Registry, Run Process, Sleep, Action, Verify, etc.) are defined to have zero or more occurrences in the schema.

Table I illustrates an example format of test data 300.

TABLE I

<TestCase>
    <TestStep . . . . . >
    </TestStep>
    . . .
    <TestStep . . . . . >
    </TestStep>
</TestCase>

As shown in the example of Table I, a TestCase element encapsulates multiple TestStep fields. Each TestStep element is, for example, a test step 302, 304, ..., 306 of FIG. 3. Each TestStep element can optionally include attributes that describe the nature of the test step. The set of tests begins with a <TestCase> entry, and a </TestCase> entry functions to delimit the end of the set of tests. Similarly, each test step begins with a <TestStep> entry, and a </TestStep> entry functions to delimit the end of the description of each test step.

Various operations can be identified in test data 300. In accordance with certain embodiments, at least the following operations can be identified in test data 300: Run Process, Action, Verify, Set Property, Sleep, Wait For State, and Registry. A schema defines these operations and their attributes, as discussed in more detail below. In the schema and in test data 300, these different operations are also described as being elements. For example, a run process operation can be described using a run process element in test data 300.

Some of these operations in test data 300 make use of a UI Control element. A UI Control element represents a UI component, such as a button, textbox, scrollbar, and so forth. Any component for receiving user input and/or providing output to a user can be a UI component. A UI Control can be nested within another UI control (e.g., a window control can contain a button control). A UI Control can be identified based on the attributes that are specified. For example, a UI Control element can be identified by name, identifier, type, class, handle, caption alone or by a combination of the attributes specified.

In certain embodiments, an operation that acts on a particular UI control specifies the UI control to be acted on. Alternatively, no UI Control may be explicitly specified, in which case the UI Control that is contained in the same element (the element of the operation, or the Test Step element) is implicitly specified as the UI control to be acted on.

The Run Process operation runs an executable, such as a script file, a .exe file, a .bat file, and so forth, and can verify the exit code of the executable. The Run Process operation can include one or more of a command attribute, a name attribute, an arguments attribute, and an expected exit code attribute. The command attribute specifies the executable to be run. The name attribute specifies the name of the executable to be run. The arguments attribute specifies one or more command line arguments that can be passed to the executable when it is run. The expected exit code attribute identifies the exit code that is expected from running the executable (if omitted, a default value such as "0" can be used). Table II illustrates an example of a RunProcess operation.

TABLE II

<RunProcess Command="notepad.exe" Arguments="c:\File.txt" Name="file - Notepad" ExpectedExitCode="0"/>

As shown in Table II, an example Run Process operation includes a command attribute, a name attribute, an arguments attribute, and an expected exit code attribute. The command attribute specifies the path and name of the executable to be run (notepad.exe—in this case just the executable name is enough and path is not needed since a Path system environment attribute can find the executable), and the arguments attribute specifies that "c:\file.txt" is to be passed to notepad.exe when it is run. The name attribute specifies the name of the executable as well as the input to the executable (notepad, with the input of "file"). The expected exit code attribute specifies the exit code expected from the execution of notepad.exe ("0").

The Action operation specifies an action to be taken on a UI Control. An action can be taken on a UI Control (e.g., a Click type of action can be taken on a button, a Scroll type of action can be taken on a ScrollBar, and so forth). A Verify operation can be specified in an Action to verify that the action produces a result that brings up another UI Control, or an action produces a result that can be verified by checking some registry value is set to a known value, or a file is created or a Service is started or stopped, and so forth. The Verify operation can be described in an element that is a child of the Action operation element, or alternatively the Verify element may be a separate operation from the Action operation (the Verify element may not be a child element of the Action).

The Action operation is converted to a method call(s) on the API library by the test engine. The Action operation can include one or more of a type attribute, a description attribute, and a data attribute. The type attribute maps to a name of a method in a class in the API library. Typically the type attribute matches (is the same as) the name of the method in the class, but alternatively may be different (in which case the test engine is programmed with, or otherwise has access to, the mapping of the type attribute to the name of the method). The type attribute indicates the type of action to be taken on a UI Control, such as sending keys (alphanumeric characters or other values) to the UI Control, selecting a menu option in the UI Control, clicking a button in the UI Control, and so forth. Any type of input or selection that can be made in a UI Control can be identified as a type in an Action operation.

The description attribute describes the action that is being performed. For example, the description attribute may indicate that the action is selection of a save menu item, entering of the text of a password, entering a web address, and so forth. The data attribute describes the data to be input as part of the action. When included, the data to be input is one or more characters, such as alphanumeric characters, punctuation marks, ideograms, and/or other symbols. For example, if the action is to enter a password into a UI Control, then the data attribute identifies the characters in the password.

The UI Control on which the action described in the Action operation is to be performed is typically included as part of the Action operation. This allows the specific UI Control for the Action operation to be identified. The UI Control can include one or more of a type attribute, a class attribute, and an identification attribute. The type attribute identifies the class name of the UI Control in the API library. The API library typically employs class names for UI Controls that are the same as the class names for the UI Controls used by the operating system on which the API library is running (for example, any of the Microsoft Windows® operating systems). However, in some situations these class names may be different. If the class names are different, then the class attribute is used to identify the corresponding class name used by the operating system on which the API library is running.

The identification attribute is used to identify the particular UI Control. UI Controls can be identified in different manners, and the identification attribute can take different forms depending on the manner in which the UI Control is identified. For example, the UI Control may be identified by a caption, by a unique identifier code, and so forth.

Table III illustrates an example of an Action operation.

TABLE III

<Action Type="SendKeys" Description="Enter password" Keys="Sammamish!">
    <UIControl Type="Window" Caption="New User">
        <UIControl Type="TextBox" Class="Edit" Identifier="1172"/>
    </UIControl>
</Action>

As shown in Table III, an example Action operation has type, description, and data attributes. The type attribute maps to a "SendKeys" method of the API library, the description attribute identifies the action being performed (entering a password), and the data attribute (keys="Sammamish!") identifies the data that is to be input as part of the action. The UI Control on which the Action operation is to be performed is identified using the fully qualified path of the UI Control from the top level window in the user interface. The top level window is identified by a UI Control having a type attribute of "Window" and an identification attribute (a caption) of "New User". The UI Control into which the password data is to be input is identified as having a type attribute of "TextBox", a class attribute of "Edit", and an identification attribute (an identifier code) of "1172".

The Verify operation specifies a verification to be performed. Verify can be a child element of an Action element or can be a child element of a Test Step element. The Verify operation can verify that a UI Control exists, that a UI Control is visible, that a UI Control has a certain value, and so forth. The Verify operation can also verify non-UI status, such as by specifying a service name to verify that the service is started or stopped, by specifying a registry value to verify that an operating system registry entry is set to a known value, by specifying a file name to verify that the file is created, and so forth.

The Verify operation can check the existence of something (e.g., the existence of a UI Control, a registry entry, a file, a service, and so forth), or can check the state of a control passing an expected value. The Verify operation can also include different timing parameters to permit verifying that something occurred within a desired time frame. The Verify operation can include one or more of a description attribute, an exists attribute, a state value pair attribute, and a performance time limit attribute. The Verify operation can return an indication of the results of the Verify operation (that is, whether the verification was successful). This indication can be returned in any of a variety of manners, such as by generating a log or other report of results, issuing a notification to a user (e.g., an on-screen or an audible warning), and so forth.

The description attribute describes the verification that is being performed. The exists attribute describes a particular item (e.g., a UI Control, a registry entry, a file, a service, etc.) that is to exist or is not to exist (e.g., set to "true" to indicate that the particular item should exist, and set to "false" to indicate that the particular item should not exist). The state value pair attribute describes a particular property and corresponding value the property should have. The performance time limit attribute specifies a particular amount of time within which something should occur or exist (e.g., that a UI Control should exist, that a web page should be done loading, that a file should be done loading from a file server, that a service should be available, that a particular property should have a particular value, and so forth). The performance time limit attribute typically has an associated default unit, such as seconds, although different units could alternatively be identified in the performance time limit attribute.

The UI Control on which the action described in the Verify operation is to be performed is typically included as part of the Verify operation. This allows the specific UI Control for the Verify operation to be identified. The UI Control can include one or more of a type attribute, a class attribute, and an identification attribute, as discussed above with respect to the Action operation.

Table IV illustrates an example of a Verify operation.

TABLE IV

<Verify Description="Verify that the Add/Remove snap-in dialog is open" PerformanceTimeLimit="0.1">
   <UIControl Type="Window" Caption="Add or Remove Snap-ins"></UIControl>
      <Exists>true</Exists>
</Verify>

As shown in Table IV, an example Verify operation has description, performance time limit, and exists attributes. The description attribute identifies the action being performed (verifying that a particular dialog is open), and the performance time limit attribute ("0.1") indicates the maximum amount of time that it should take for the dialog to open (after the request to open the dialog was issued, either earlier in this same test step or in a previous test step). The UI Control on which the Action operation is to be performed is identified using the fully qualified path of the UI Control from the top level window in the user interface. The UI Control whose existence is to be verified is identified as having a type attribute of "Window", and an identification attribute (a caption) of "Add or Remove Snap-ins". The exists attribute (set to true) indicates that the Verify operation should check that the UI Control exists.

Table V illustrates another example of a Verify operation.

TABLE V

<Verify Description="Verify Checkbox status to be enabled">
   <UIControl Type="Window" Caption="MyCheckbox">
      <UIControl Type="Checkbox" Identifier="504"/>
   </UIControl>
   <StateValuePair>
      <State>IsEnabled</State>
      <Value>True</Value>
   </StateValuePair>
</Verify>

As shown in Table V, an example Verify operation has description and state value pair attributes. The description attribute identifies the action being performed (verifying a checkbox status to be enabled). The UI Control on which the Action operation is to be performed is identified using the fully qualified path of the UI Control from the top level window in the user interface. The top level UI Control is identified as having a type attribute of "Window", and an identification attribute (a caption) of "MyCheckbox". The UI Control whose status is to be verified as enabled is identified as having a type attribute of "Checkbox", and an identification attribute (an identifier code) of "504". The state value pair attribute indicates that the property of "IsEnabled" is to have a value of "True".

The Verify operation, and optionally other operations discussed herein, can describe certain elements, such as a UI Control, a registry entry, a file, a service, etc. The UI Control is discussed above, and the registry entry is discussed in more detail below with respect to the Registry operation. The file element can be used to identify a particular file in the specified path location. The file element includes a path attribute that specifies the location of the file.

Table VI illustrates an example of a file element.

TABLE VI

<File Path="c:\file.txt"/>

As shown Table VI, an example file element" has a path attribute. The path attribute identifies the particular file being identified as "c:\file.txt".

The service element can be used to identify a particular service. The service element includes one or more of a name attribute, a display name attribute, and a status attribute. The name attribute identifies the name of the service. The display name attribute identifies a user-friendly name of the service (e.g., that can be displayed to and more easily understood by most users). The status attribute identifies the status of the service that is to be verified (e.g., verify the status is stopped, paused, running, and so forth). Table VII illustrates an example of a service element.

TABLE VII

<Service Name="Netman" DisplayName="Network Connections" Status="Running"/>

As shown Table VII, an example service element has a name attribute, a display name attribute, and a status attribute. The name attribute identifies the name of the service being identified as "Netman". The display name attribute identifies the user-friendly name of the service as "Network Connections". The status attribute identifies that the identified service is to have the status "Running".

The Set Property operation changes the value of a property of a UI Control. The Set Property operation can include one or more of a description attribute and a state value pair attribute. The description attribute describes the setting that is being performed. The state value pair attribute describes a particular property and the value that the property should be set to.

The UI Control on which the action described in the Set Property operation is to be performed is typically included as part of the Set Property operation. This allows the specific UI Control for the Set Property operation to be identified. The UI Control can include one or more of a type attribute, a class attribute, and an identification attribute, as discussed above with respect to the Action operation.

Table VIII illustrates an example of a Set Property operation.

TABLE VIII

```
<SetProperty>
    <UIControl Type="Window" Caption="New User">
        <UIControl Type="CheckBox" Identifier="257"/>
    </UIControl>
    <StateValuePair>
        <State>ButtonState</State>
        <Value>UnChecked</Value>
    </StateValuePair>
</SetProperty>
```

As shown Table VIII, an example Set Property operation has a state value pair attribute (no description attribute is illustrated in the example of Table VIII). The UI Control on which the Set Property operation is to be performed is identified using the fully qualified path of the UI Control from the top level window in the user interface. The top level window is identified as having a type attribute of "Window" and an identification attribute (a caption) of "New User". The UI Control whose property is to be set is identified as having a type attribute of "CheckBox", and an identification attribute (an identifier code) of "257". The state value pair attribute indicates that the property "ButtonState" is to be set to the value "UnChecked".

The Sleep operation causes the test engine to pause performing the test(s) in the test data for the amount of time specified by the Sleep operation. After pausing for the specified amount of time, the test engine resumes performing the tests. The Sleep operation typically includes a duration attribute that specifies the amount of time that the test engine should pause. The duration attribute typically has an associated default unit, such as seconds, although different units could alternatively be identified in the duration attribute. Table IX illustrates an example of a Sleep operation.

TABLE IX

```
<Sleep Duration="10.0"/>
```

As shown in Table IX, an example Sleep operation includes a duration attribute. The duration attribute specifies that the test engine should pause performing the test(s) in the test data for 10.0 seconds.

The Wait For State operation causes the test engine to pause performing the test(s) in the test data until the state specified in the Wait For State operation occurs. The Wait For State operation can include one or more of a description attribute, a state value pair attribute, a maximum time limit attribute, and a performance time limit attribute. The description attribute describes the waiting that is being performed. The state value pair attribute describes a particular property and the value that the property should have in order for the test engine to continue with performing the test(s) in the test data. The maximum time limit attribute identifies the maximum amount of time the test engine will pause the test(s) in the test data. If the amount of time specified by the maximum time limit is exceeded, then the test engine continues with performing the test(s) in the test data (or alternatively signals an error and waits for user input as to how to continue). The performance time limit attribute identifies how often the property identified in the state value pair attribute should be checked. The maximum time limit and performance time limit attributes typically have an associated default unit, such as seconds, although different units could alternatively be identified in these attributes.

The UI Control on which the action described in the Wait For State operation is to be performed is typically included as part of the Wait For State operation. This allows the specific UI Control for the Wait For State operation to be identified. The UI Control can include one or more of a type attribute, a class attribute, and an identification attribute, as discussed above with respect to the Action operation.

Table X illustrates an example of a Wait For State operation.

TABLE X

```
<WaitForState MaximumTimeLimit="20.0"
PerformanceTimeLimit="0.1">
    <UIControl Type="Window" Caption="New User">
        <UIControl Type="CheckBox" Identifier="257"/>
    </UIControl>
    <StateValuePair>
        <State>IsEnabled</State>
        <Value>True</Value>
    </StateValuePair>
</WaitForState>
```

As shown in Table X, an example Wait For State operation includes a maximum time limit attribute and a performance time limit attribute. The maximum time limit attribute specifies that the test engine should pause performing the test(s) in the test data for no more than 20.0 seconds. The performance time limit attribute specifies that the test engine should check the specified property every 0.1 seconds to see if the desired state has been reached. The UI Control on which the Wait For State operation is to be performed is identified using the fully qualified path of the UI Control from the top level window in the user interface. The top level window is identified as having a type attribute of "Window" and an identification attribute (a caption) of "New User". The UI Control whose property is to be set is identified as having a type attribute of "CheckBox", and an identification attribute (an identifier code) of "257". The state value pair attribute indicates that the property "IsEnabled" is to be set to the value "True".

The Registry operation allows the operating system registry to be acted on, such as to update or retrieve a value from a registry. The Registry operation can be a child element of a Test Step element or a Verify element. A Registry operation under a Test Step element typically updates the registry value, and a Registry operation under a Verify element typically retrieves a registry value for verification purposes.

The Registry operation can read a value from the registry, or alternatively set a value in the registry. The Registry operation can include one or more of a description attribute, a path attribute, a data type attribute, a data attribute, an update attribute, and a delete attribute. The description attribute describes the registry item that is being operated on. The path attribute specifies the item in the operating system registry that is to be read or written. The data type attribute specifies the value type of the specified item in the operating system registry. The data attribute specifies the value of the data to update the registry element to. The update attribute is set to true in the case where the registry item is to be created and/or updated. The update attribute is set to false in the case where the registry item value is to be read. The delete attribute is used to delete a registry item. The delete and update attributes typically are not used together in the same Registry operation. Such verifications regarding the usage of certain attribute combinations can be done as a post-schema XML validation step of the automation test tool.

Table XI illustrates an example of a Registry operation.

TABLE XI

<Registry Path="HKEY_CURRENT_USER\Test9999\kl\no" Data="1234" DataType ="DWord" Update="true"/>

As shown in Table XI, an example Registry operation includes a path attribute, a data attribute, a data type attribute, and an update attribute. The path attribute specifies that the entry in the operating system registry that is to be written to is "HKEY_CURRENT_USER\Test9999\kl\no". The data type attribute specifies the type of data that is to be written is "DWord". The data attribute specifies the value of the data to update the registry entry to is "1234". The update attribute is set to true to indicate that the registry entry is to be created/updated.

With respect to the various operations and attribute values in the test data, it should be noted that when determining the appropriate API method(s) to invoke, the test engine can optionally make use of wildcard values. Regular expressions may be used, or alternatively other wildcard techniques could be used. Wildcard values allow partial matches, using various characters (for example, an asterisk or question mark) to indicate one or more portions of the value that can be anything. For example, an attribute of caption="Microsoft*" could be used to indicate any caption that begins with "Microsoft" regardless of what additional characters may follow "Microsoft".

It should also be noted that various default configuration values may be used by test engine. In certain embodiments, these default configuration values are stored in a configuration file that is accessible to the test engine. The user can, if desired, change these default configuration values. These default configuration values are used unless overridden by a particular operation discussed above. In certain embodiments, the default configuration values include default values for the delay between actions, the maximum time limit, and the performance time limit. These default values typically have an associated default unit, such as seconds, although different units could alternatively be used. The delay between actions refers to the time that the test engine should wait between action operations. The maximum time limit attribute identifies the maximum amount of time the test engine will wait for a UI Control to appear. If the amount of time specified by the maximum time limit is exceeded, then test engine continues with performing the test(s) in the test data (or alternatively signals an error and waits for user input as to how to continue). The performance time limit attribute identifies how often the test engine should check for the appearance of the UI Control.

Figure 4:
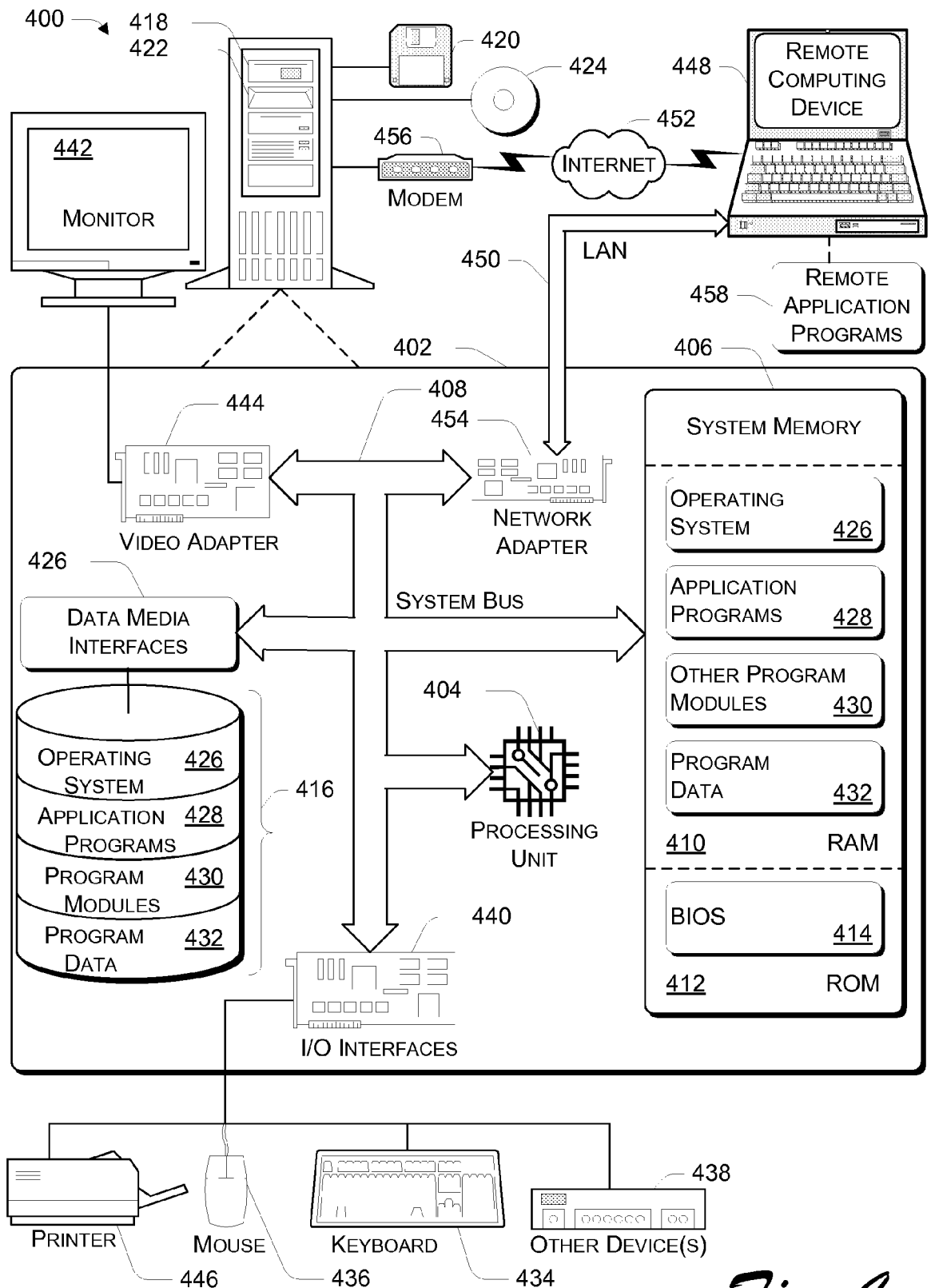
FIG. 4 illustrates an example general computer environment which can be used to implement the techniques described herein.

FIG. 4 illustrates an example general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402. Computer 402 can be, for example, a system 100 of FIG. 1, or a computing device on which at least a portion of process 200 of FIG. 2 are implemented. Computer 402 can be, for example, a desktop computer, a handheld computer, a notebook or laptop computer, a server computer, a game console, and so on. Computer 402 can include, for example, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable medium.

Alternatively, all or portions of these modules and techniques may be implemented in hardware or a combination of hardware, software, and/or firmware. For example, one or more application specific integrated circuits (ASICs) or programmable logic devices (PLDs) could be designed or programmed to implement one or more portions of the framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media having stored thereon a plurality of instructions to test a user interface of a program, the plurality of instructions, when executed by one or more processors, causes the one or more processors to:

access test data, the test data including a plurality of test steps, each test step describing at least a part of a test to be performed on the user interface;

determine, for each of the plurality of test steps, one or more application program interface (API) methods to invoke to carry out the part of the test, the determination being based at least in part on the test data and on methods supported by the API and to obtain, from the API, an identification of methods supported by the API;

invoke each of the one or more API methods to carry out the part of the test.

2. One or more computer-readable storage media as recited in claim 1, wherein to determine one or more API methods to invoke is to, for each of the plurality of test steps:

identify one or more attributes of an operation in the test step;

identify which one or more API methods can be invoked using the identified one or more attributes; and select one of the identified one or more API methods.

3. One or more computer-readable storage media as recited in claim 1, wherein each of the plurality of tests steps includes one or more of a Run Process operation, an Action operation, a Verify operation, a Set Property operation, a Sleep operation, a Wait For State operation, and a Registry operation.

4. One or more computer-readable storage media as recited in claim 1, wherein the tests data includes a Run Process operation, an Action operation, a Verify operation, a Set Property operation, a Sleep operation, a Wait For State operation, and a Registry operation.

5. One or more computer-readable storage media as recited in claim 1, wherein to invoke each of the one or more API methods is to invoke each of the one or more API methods using one or more attributes of an operation in the test step of the test data.

6. A computer executable method for testing a user interface of a program, the computer executable method comprising:

identifying a portion of a test to be performed on the user interface;

determining, based at least in part on data associated with the identified portion, which one or more of a plurality of application program interface (API) methods can be called using the data to carry out the portion of the test; and calling at least one of the one or more API methods to carry out the portion of the test;

wherein determining which one or more of a plurality of API methods to call comprises:

identifying one or more attributes of an operation in the portion of the test;

identifying which one or more API methods can be called using the identified one or more attributes; and selecting one of the identified one or more API methods.

7. A computer executable method as recited in claim 6, wherein the portion of the test includes one or more of a Run Process operation, an Action operation, a Verify operation, a Set Property operation, a Sleep operation, a Wait For State operation, and a Registry operation.

8. A computer executable method as recited in claim 6, wherein calling at least one of the one or more API methods comprises calling each of the at least one API methods using one or more attributes of an operation in the portion of the test.

9. A computer-readable storage media having stored thereon a data structure comprising:

a first data field containing data representing a step in a test of a user interface of a program;

a second data field containing data representing a user interface control of the user interface;

a third data field containing data representing an action to be taken, as part of the step in the test, on the user interface control;

wherein one of the actions to be taken comprises a Set Property operation that changes the value of a property of the user interface control; and a fourth data field functioning to delimit the end of the data structure.

10. A computer-readable storage media as recited in claim 9, wherein the data structure is in an eXtensible Markup Language (XML) format.

11. A computer-readable storage media as recited in claim 9, wherein the action to be taken is identified by an Action operation having a plurality of attributes.

12. A computer-readable storage media as recited in claim 11, wherein the plurality of attributes comprises:

a type attribute that maps to a name of a method in a class in an application program interface (API) library;

a description attribute that describes the action to be taken; and a data attribute that describes the data to be input to the user interface control as part of the action.

13. A computer-readable storage media as recited in claim 9, wherein the action to be taken comprises a Verify operation that specifies a verification to be performed, the Verify operation having a plurality of attributes.

14. A computer-readable storage media as recited in claim 13, wherein the plurality of attributes comprises one or more of:

an exists attribute that describes a particular item that is to exist;

a state value pair attribute that describes a particular property and a corresponding value the property should have; and a performance time limit attribute that specifies a particular amount of time within which a particular item should exist.

15. A computer-readable storage media as recited in claim 9, wherein the action to be taken comprises a Run Process operation that runs an executable.

16. A computer-readable storage media as recited in claim 9, wherein the action to be taken comprises a Wait For State operation that causes a test engine to pause the test until a state specified in the Wait For State operation occurs.

17. A computer-readable storage media as recited in claim 9, wherein the action to be taken comprises a Registry operation that allows an operating system registry to be acted on.

* * * * *